US006975308B1

(12) United States Patent
Bitetto et al.

(10) Patent No.: US 6,975,308 B1
(45) Date of Patent: Dec. 13, 2005

(54) DIGITAL PICTURE DISPLAY FRAME

(76) Inventors: Frank W. Bitetto, 29 Georgia St., East Northport, NY (US) 11731; James J. Bitetto, 4 Alley Pond Rd., Dix Hills, NY (US) 11746

( * ) Notice: Subject to any disclaimer, the term of this patent is extended or adjusted under 35 U.S.C. 154(b) by 0 days.

(21) Appl. No.: 09/502,931

(22) Filed: Feb. 11, 2000

Related U.S. Application Data

(60) Provisional application No. 60/131,920, filed on Apr. 30, 1999.

(51) Int. Cl.[7] ............................................. G09G 5/00
(52) U.S. Cl. ...................... 345/204; 345/104; 345/2.1; 345/901
(58) Field of Search ........................ 345/204, 2.1, 2.2, 345/1.3, 104, 207, 901; 348/24, 135, 552, 348/589, 363, 231

(56) References Cited

U.S. PATENT DOCUMENTS

| 4,791,589 A | * | 12/1988 | Blazo et al. ................ 348/659 |
| 4,814,759 A | * | 3/1989 | Combrich et al. .......... 340/771 |
| 5,504,836 A | * | 4/1996 | Loudermilk ................ 704/272 |
| 6,005,606 A | * | 12/1999 | Nakano ....................... 348/24 |
| 6,069,648 A | * | 5/2000 | Suso et al. ............... 348/14.02 |
| 6,097,441 A | * | 8/2000 | Allport ....................... 348/552 |
| 6,262,763 B1 | * | 7/2001 | Totsuka et al. ............. 348/135 |
| 6,266,069 B1 | * | 7/2001 | Thagard et al. ............. 405/102 |
| 6,269,173 B1 | * | 7/2001 | Hsien .......................... 382/103 |
| 6,285,398 B1 | * | 9/2001 | Shinsky et al. ............. 345/603 |
| 6,317,165 B1 | * | 11/2001 | Balram et al. .............. 348/448 |
| 6,339,429 B1 | * | 1/2002 | Schug ......................... 345/589 |
| 6,380,975 B1 | * | 4/2002 | Suzuki ..................... 348/231.99 |
| 6,396,472 B1 | * | 5/2002 | Jacklin ........................ 345/104 |
| 6,400,996 B1 | * | 6/2002 | Hoffberg et al. ............. 700/83 |
| 6,424,998 B2 | * | 7/2002 | Hunter ........................ 705/26 |
| 6,441,828 B1 | * | 8/2002 | Oba et al. ................... 345/659 |
| 6,442,336 B1 | * | 8/2002 | Lemelson ................... 386/117 |
| 6,510,553 B1 | * | 1/2003 | Hazra .......................... 725/87 |
| 6,625,383 B1 | * | 9/2003 | Wakimoto et al. .......... 386/46 |
| 6,717,567 B1 | * | 4/2004 | Bowden et al. ............. 345/104 |

* cited by examiner

Primary Examiner—Regina Liang
Assistant Examiner—Jennifer T. Nguyen
(74) Attorney, Agent, or Firm—Keusey, Tutunjian & Bitetto, P.C.

(57) ABSTRACT

The present invention provides a picture frame for displaying digital images taken by a digital camera. The invention may be a wall mounted frame or a desk top frame. The invention includes a display, such as an active matrix display for rendering images for viewing. The invention includes an interface for manipulating images by using a graphical user interface in conjunction with an operating system. The present invention may be employed for displaying overhead projection slides for conferences, lectures and meetings. The invention includes sensors for monitoring conditions in areas around the frame. The frame includes floppy disk and CD/DVD drives for transferring data to a memory of the frame. The memory of the frame is used to store images and may select images according to a program or list.

31 Claims, 4 Drawing Sheets

DIGITAL PICTURE DISPLAY FRAME

CROSS REFERENCE TO RELATED APPLICATION

This disclosure claims priority to provisional application No. 60/131,920, filed on Apr. 30, 1999, and incorporated herein by reference.

BACKGROUND

1. Field of the Invention

The present invention relates to digital picture displays, and more particularly to wall mounted or table top picture frames for displaying digital images.

2. Description of the Related Art

With the development of digital cameras and digital image rendering for personal computers, pictures may now be stored in a memory storage device such as a hard drive of a computer. Such pictures require a video card so that they be rendered on the computer display for viewing. Although storage of the digital images on a computer is space effective and efficient, it may not be suitable for every day use since the image must be retrieved from memory and displayed on the computer display.

In some instances, individuals desire a more conventional viewing of the image. Specialized printers such as photo printers or color printers may be used to produce hard copies of a photograph or image. These printers are often expensive or do not reproduce the photograph with sufficient detail or resolution to satisfy the viewer or the photographer.

Conventional photographs provide the best resolution images. However, conventional photography requires picture development which may result in a wait period before developed pictures are available, unless an instant camera is used. Conventional development techniques also employ harsh chemicals which may not be environmentally safe. Instant cameras often produce images which are not as good and conventional photographs. Film for instant cameras is also very expensive.

Therefore, a need exists for a digital display frame which is capable of downloading digital images from a computer or digital camera for display on a wall or a desk top. A further need exists for a digital picture frame that stores digital images and displays the images using an active matrix display or other type of display.

SUMMARY OF THE INVENTION

The present invention provides a picture frame for displaying digital images taken by a digital camera or scanned into a computer, downloaded from the Internet, etc. The pictures may be stored on a storage medium or transferred directly to the picture frame. The invention may be a wall mounted frame or a desk top frame. The invention includes a display, such as an active matrix display for rendering images for viewing. The invention includes an interface for manipulating images by using a graphical user interface in conjunction with an operating system. The present invention may be employed for displayed overhead projection slides for conferences, lectures and meetings. The invention includes sensors for monitoring conditions in areas around the frame. The frame includes floppy disk and/or CD/DVD drives for transferring data to a memory of the frame. The frame may also be adapted to receive memory cards form digital cameras directly. The memory or the frame is used to store images and may select images according to a program or list.

In accordance with the present invention, a picture display for displaying still digital pictures includes a mountable picture frame adapted to digitally display at least one still image thereon. The picture frame is a stand-alone unit used to replace a conventional picture frame. The picture frame includes a display screen for displaying the at least one still image stored in a memory. The memory stores at least one still image therein. An interface is coupled to the memory for downloading still images to the memory.

In alternate embodiments, the display may include a microprocessor coupled to the memory for managing display data for still images. The display may also include control circuitry coupled to the display for activating the display in accordance with an event. The event may include one of a predetermined time or date, a change in light intensity, a sound and motion detected in proximity of the display. The control circuitry may change an image displayed in accordance with an event. The interface may be adapted to receive image data from a digital camera, a VCR, the Internet or a computer. The interface may be adapted to receive image data from a portable memory device. The picture frame may include be wall mountable or desk top mountable. The picture frame may be adapted to receive a plug for a power source. The display may include an operating system stored in the memory for permitting a user to interact with the picture frame. The operating system may be stored in the memory and permit the user to select from a plurality of images stored therein to display on the screen. The display may include a speaker for providing sounds stored in the memory in accordance with an event. The event may include one of a predetermined time or date, a change in light intensity, a sound and motion detected in proximity of the display.

Another picture display for displaying digital images, in accordance with the invention, includes a wall mountable display adapted to digitally display still images thereon. The display is a stand alone unit including a processor coupled to the display for managing data to be displayed on a screen of the display, the data being stored in a memory, and a portable memory device drive coupled to the memory through the processor and adapted to receive portable memory devices for downloading images from the portable memory devices. The memory is coupled to the processor for storing images to be displayed on the screen, the memory being adapted to receive image data from a portable memory device.

In alternate embodiments, the portable memory device drive may be adapted to receive image data from one of a compact disk, DVD and a floppy disk. The portable memory device drive may be adapted to receive image data from one of a digital camera, a VCR, the Internet and a computer. The display may include a picture frame. The display may be adapted to receive a plug for a power source. The display may include an operating system stored in the memory for permitting a user to interact with the display. The operating system stored in the memory may permit the user to select from a plurality of images stored in the memory or on the portable memory device to display on the screen. The display may include a microphone for interacting with the display. The display may include a digital camera coupled to the processor for displaying images taken in real-time.

Another picture display for displaying still digital pictures, in accordance with the present invention, includes a wall mountable or desk top mountable picture frame adapted to digitally display at least one still image thereon. The picture frame is a stand alone unit including a display screen for displaying the at least one still image stored in a memory, the memory for storing the at least one still image, a microprocessor coupled to the memory for managing display data for the at least one still image, control circuitry coupled to the microprocessor for one of activating the display in accordance with an event and changing an image displayed in accordance with the event, a speaker coupled to the control circuitry for providing sounds stored in the memory in accordance with the event, an interface coupled to the memory for downloading still images to the memory, and a power adapter for receiving a plug for a power source.

In alternate embodiments, the event may include one of a predetermined time or date, a change in light intensity, a sound and motion detected in proximity of the display. The interface may be adapted to receive image data from a digital camera, a VCR, the Internet, and a computer. The interface may be adapted to receive image data from a portable memory device. An operating system may be stored in the memory for permitting a user to interact with the display. The operating system stored in the memory may permit the user to select from a plurality of images stored therein to display on the screen. The display may include a digital camera coupled to the processor for displaying images taken in real-time.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

In accordance with the present invention, a digital picture display frame is disclosed for displaying digital images produced by using a digital camera. The present invention permits a user to display digital photographs on a wall or a desktop as though the image were a conventional photograph. The present invention employs a memory storage capability so that a plurality of images may be stored in the memory for display in the frame. The frame may include a plurality of interfaces for coupling to devices such as a digital camera or a computer for downloading and storing photographic images for display. The present invention may be configured with an operating system to control a plurality of different functions which will be explained in more detail herein below.

Figure 1:
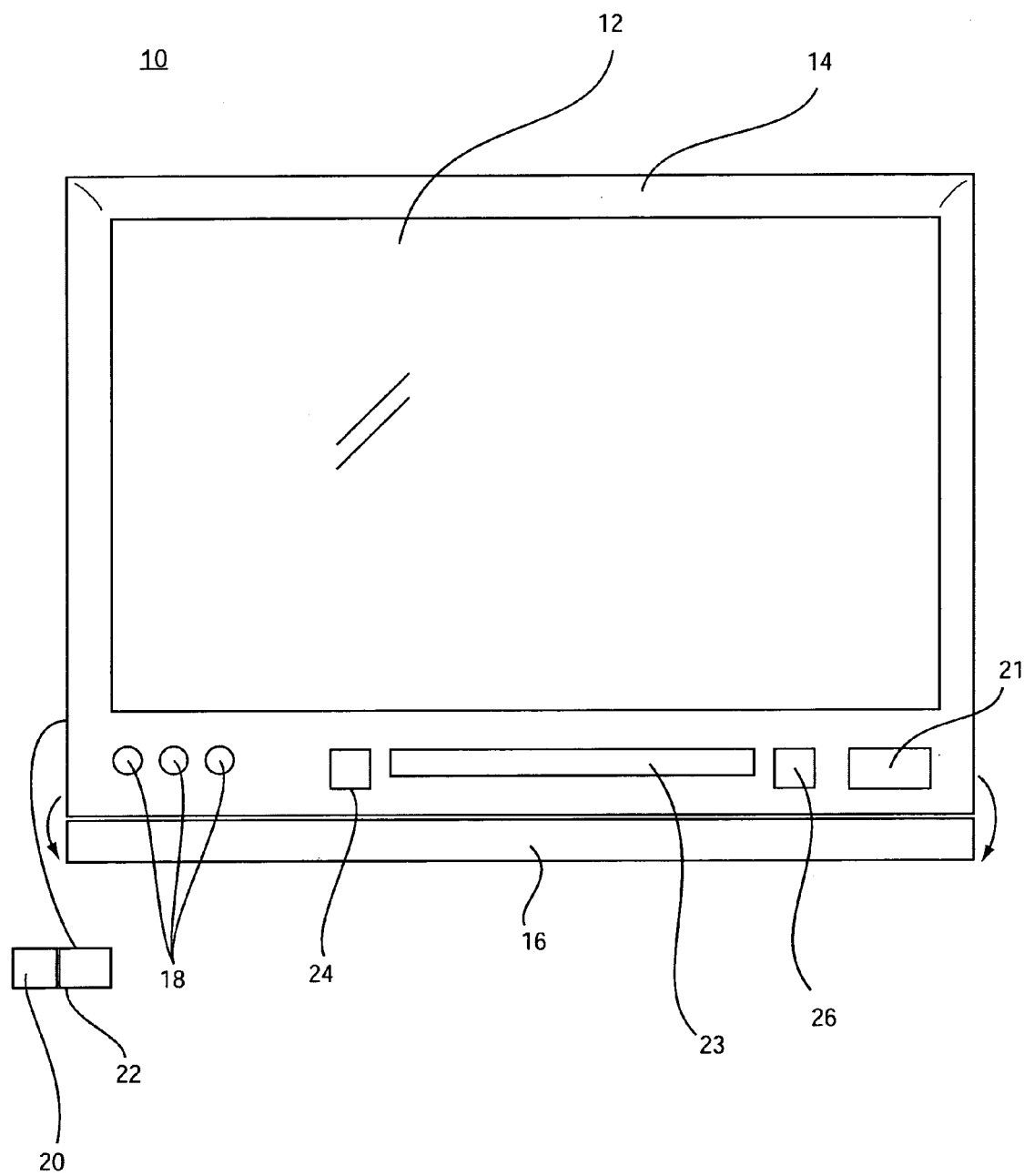
FIG. 1 is a front view of a digital picture frame in accordance with the present invention.

Referring now in specific detail to the drawings in which like reference numerals identify similar or identical elements throughout the several views, and initially to FIG. 1, a wall-mountable display frame is shown which will be generally referred to as frame 10. Frame 10 includes a screen or display 12. Display 12 may include a liquid crystal display (LCD), a passive display, an active display or any other known display. If an LCD Display 12 is employed, it is preferable that the pixels provide a relatively large viewing angle such that displayed images may be viewed from different angles. Preferably, an active matrix display with high resolution for better picture display capabilities is employed. Display resolution may be improved using anti-aliasing programs which are commercially available. These anti-aliasing programs provide a better resolution for an image, especially going from fewer pixels to a larger number of pixels. For example, a digital camera may provide an image having over 1.92 million pixels (8"×10") a larger picture may be displayed on picture frame by employing appropriate software (e.g., a pixel averaging scheme or smoothing/anti-aliasing algorithm to improve resolution for blowing up the digital image to larger sizes.

Display 12 is also preferably a flat panel display, similar to those used for laptop computers, and preferably includes an anti-reflection film thereon. In this way reflections from display 12 are reduced for improved viewing. In one embodiment, a thin film transistor (TFT) LCD display may be employed. Display 12 displays digital images and therefore does not have to be updated or refreshed as with television and/or computer screens. This conserves power and reduces the need for processing and updating the image.

Since frame 10 is a wall-mounted design, it is preferable that display 12 is lightweight and provides a low profile (low thickness dimension). It is contemplated that frame 10 will be available in a plurality of sizes and shapes. For example, frame 10 may include an oval shape, a square shape, a rectangular shape, etc. Frame 10 may include a decorative finish, style and color. For example, frame 10 may be provided with an outer portion 14 which may include a molded plastic or a carved wood finish. Other materials may also be employed. Different colors and styles for frame 10 are also contemplated. Frame 10 includes a decorative border or panel, i.e., outer portion 14. A mat (not shown) may be placed around the exterior of display which may be changed with different colors or styles. Frame 10 may include a drop down or slide portion 16 for concealing control/interface devices 18. In this way the appearance of frame 10 is maintained when control/interface devices 18 are not in use. Control/interface devices 18 may include picture quality features such as contrast, hue, color, tint, etc. Control/interface devices 18 may also include a select button or program button for selecting pictures or programs of pictures to be run as will be explained below. Control/interface devices 18 may also include a ball or joystick for moving a cursor on the screen of display 12 to select options, select alphanumeric characters for labeling files and/or photographs or other interfacing activities.

A power source 20 is coupled to frame 10 for supplying power to frame 10. In one embodiment, frame 10 includes a plug 22 for accessing standard AC power. Plug 22 may include a DC transformer for converting the AC power as needed. Since, display 12 is for displaying images less power is needed to maintain an image on the screen. In one embodiment, frame 10 includes a memory device (FIG. 5) which stores a screen saver or alters pixels of an image displayed on display 12 sufficiently to prevent "burn in" for phosphor screens and maintain activity for illuminating pixels, for example, electroluminescent pixels. In this way, an image can be displayed for an extended period of time without risk of "burn in". For example, the screen saver may include a standard screen saver, a pixel altering program such as altering colors or intensity of selected pixels or a power down mode wherein the screen goes blank. In one embodiment, a light sensor 21 is included. Light sensor 21 provides information about light intensity and alters the pixel intensities accordingly. In this way, power can be conserved in darkly lit settings. In one embodiment, an image displayed on display 12 may be changed in accordance with the amount of light detected by light sensor 21. For example, an image may be displayed of a landscape in which a picture of a sunrise is displayed in the morning and a sunset displayed in the evening, and stars, etc. displayed at night. In an alternate embodiment, such changes in the image may be provided in accordance with the time of day, or season of the year as provided by a system clock and/or calendar (i.e., triggered by a time or date). Clock/calendar information may be displayed in a window 23 which may be an LCD display or the like. Window 23 may also be utilized to display a title or information associated with an image displayed on display 12.

In another embodiment, an image displayed on display is a calendar with messages or indications of a particular day's events. This may include graphics for holiday seasons, birthdays, anniversaries, or other events. Other messages may include remarks about the day of the week "I hate Mondays", etc.

In a particularly useful embodiment, a motion sensor 24 may be included on frame 10. Motion sensor 24 may be employed to reactivate display 12 when motion is sensed in a room. For example, when display 12 is in a power down mode, a person enters a room. Motion sensor 24 senses the motion and activates display 12 to return an image to display 12. Other responses to detected motion may be employed with the present invention as well. For example, motion sensor 24 may activate an audio response, such as "welcome", "surprise", "I love you Grandma", or declare the time or other audio response.

In another particularly useful embodiment, frame 10 includes a digital camera 26 for providing images to be displayed in real time. For example, frame 10 is mounted in a room. A photograph of the room may be taken and displayed on display 12 within the room. This may be useful for family gatherings, meetings, reunions etc. Once taken the image may be downloaded to a floppy disk and reproduced by conventional means. It is contemplated that frame 10 may include a lens for photographing pictures as well.

Figure 2:
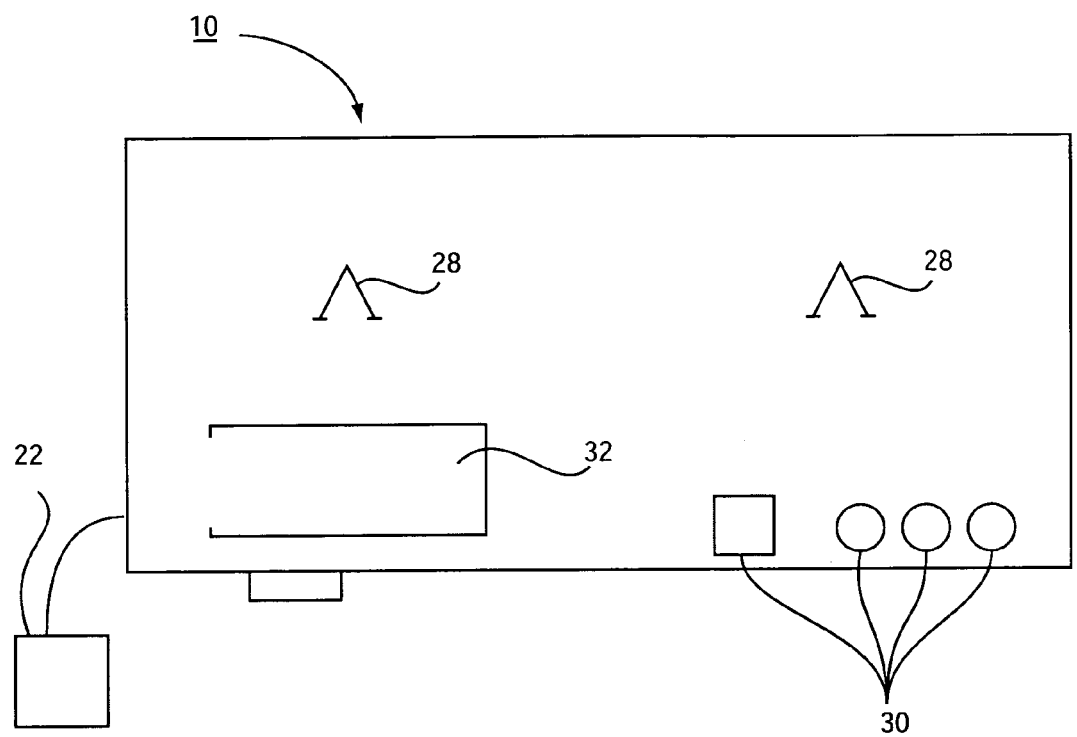
FIG. 2 is a rear view of a digital picture frame in accordance with the present invention.

Referring to FIG. 2, a backside of frame 10 is shown. Frame 10 includes an attachment apparatus 28 which may include hooks, clips, anchors, or equivalents as is known in the art for attaching a picture or other device to a wall. Interfaces 30 are provided for interfacing frame 10 to other devices such as VCRs, televisions, computers, a phone line (e.g., the Internet), a camera, etc. Frame 10 may include protocols, stored in memory (operating system), for interfacing with these devices in a similar manner as is provided by personal digital assistants (PDAs) and the like. Frame 10 may include a battery pack 32 for providing power for maintaining stored images in memory when frame 10 is transported. Battery pack 32 may include sufficient energy storage to provide full operation of frame for a limited time. Such operations may include transporting frame 10 to a remote location for downloading or uploading information (digital data for images). As such, frame 10 may be employed for storing images for a presentation or lecture. For example, frame 10 may be transported to a remote site for displaying images instead of needing an overhead projector and/or a lap top computer with overhead projection screen and adapters. Advantageously, a wall mounted frame maybe provided in a meeting room or classroom and the speaker, teacher, etc. need only bring a floppy disk with the slides or images to be shown for the lecture. These images can then be displayed by frame 10 on display 12. The images may be changed by hitting a button on the interface panel, voice activation through speaker/microphone 128 (FIG. 5), or a remote signal (similar to a remote control for a television set.

Figure 3:
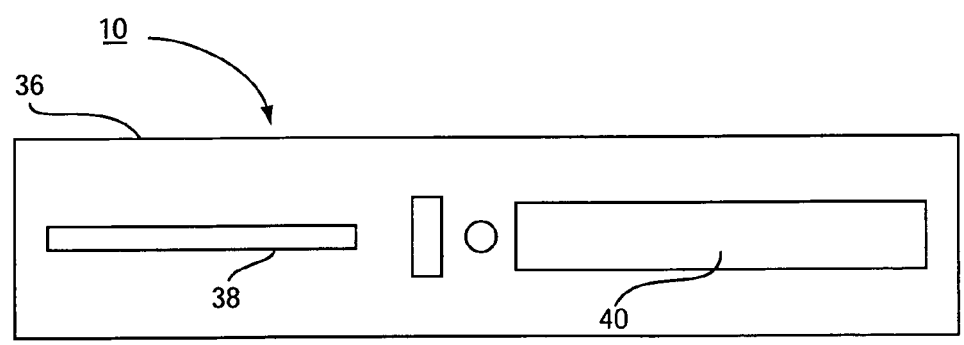
FIG. 3 is a bottom or side view of a digital picture frame in accordance with the present invention.

Referring to FIG. 3, a side panel 36 of frame 10 includes a floppy disk drive 38 and/or a compact disk/DVD disk drive 40 for reading/writing data to and from disks to the memory of frame 10. In this way, photos or images downloaded from a digital camera, the Internet, computer or other device can be stored on a floppy disk in a given format, for example TIFF, PDF, JPG, etc. and displayed on display 12. Alternately, images may be copied or stored from disk drives 38 and 40 on the memory of frame 10 and rendered from memory storage on frame 10.

Figure 4:
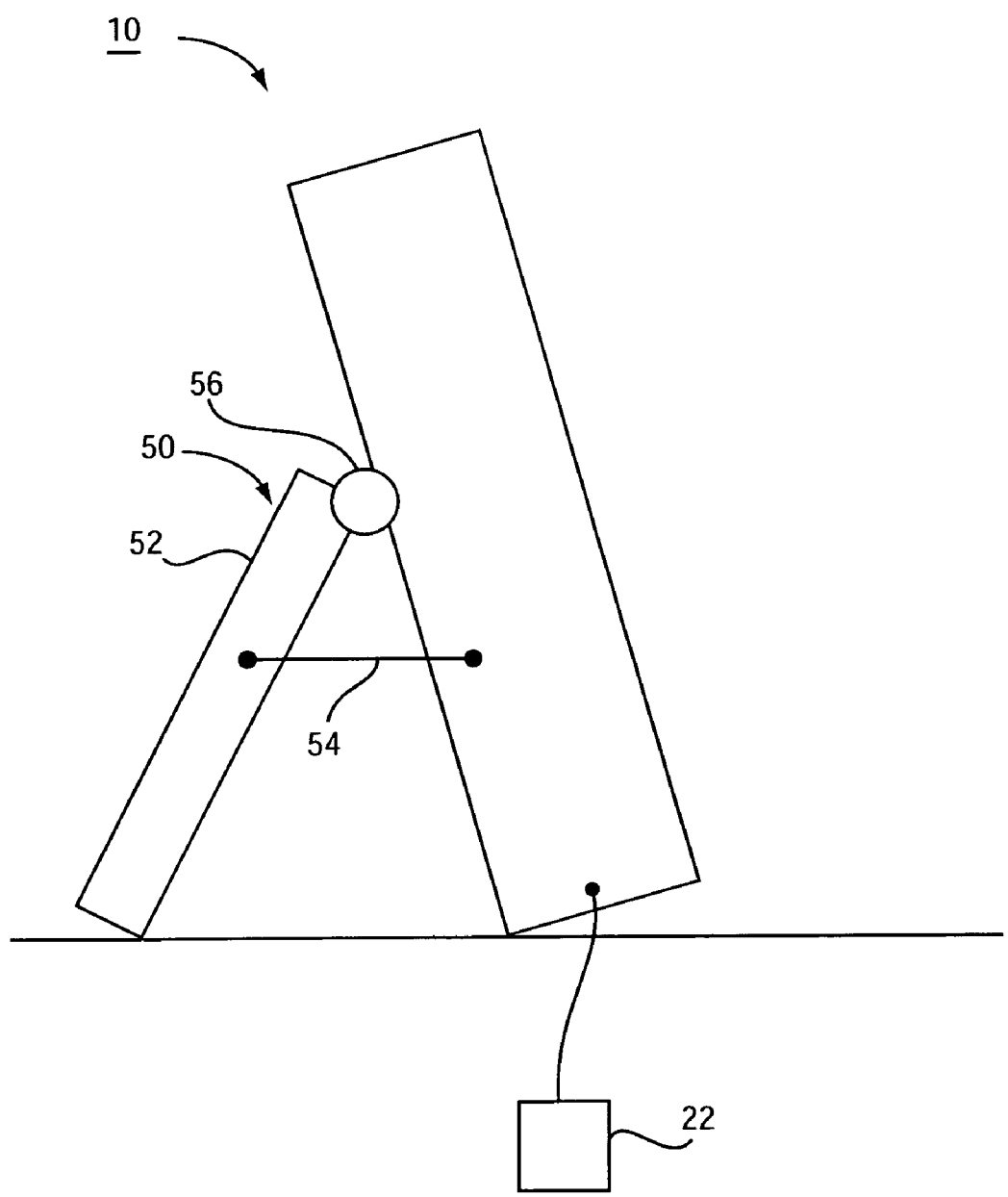
FIG. 4 is a side view of a digital picture frame for mounting on a desk or table top in accordance with the present invention.

Referring to FIG. 4, an alternate embodiment of frame 10 includes a desk or table top mounted frame 50. Frame 50 includes a stand 52 and a bar 54 for securing stand 52 to frame 50. In a preferred embodiment, stand 52 is hingedly connected to frame 52. Stand 52 is retractable by rotating toward frame 52 on hinge 56 to provide a low profile in a closed position if a wall mounted attachment is preferred. Stand 52 is in lieu of or in addition to attachment apparatus for wall mounting. In this way, a user may select where to display frame 10.

Figure 5:
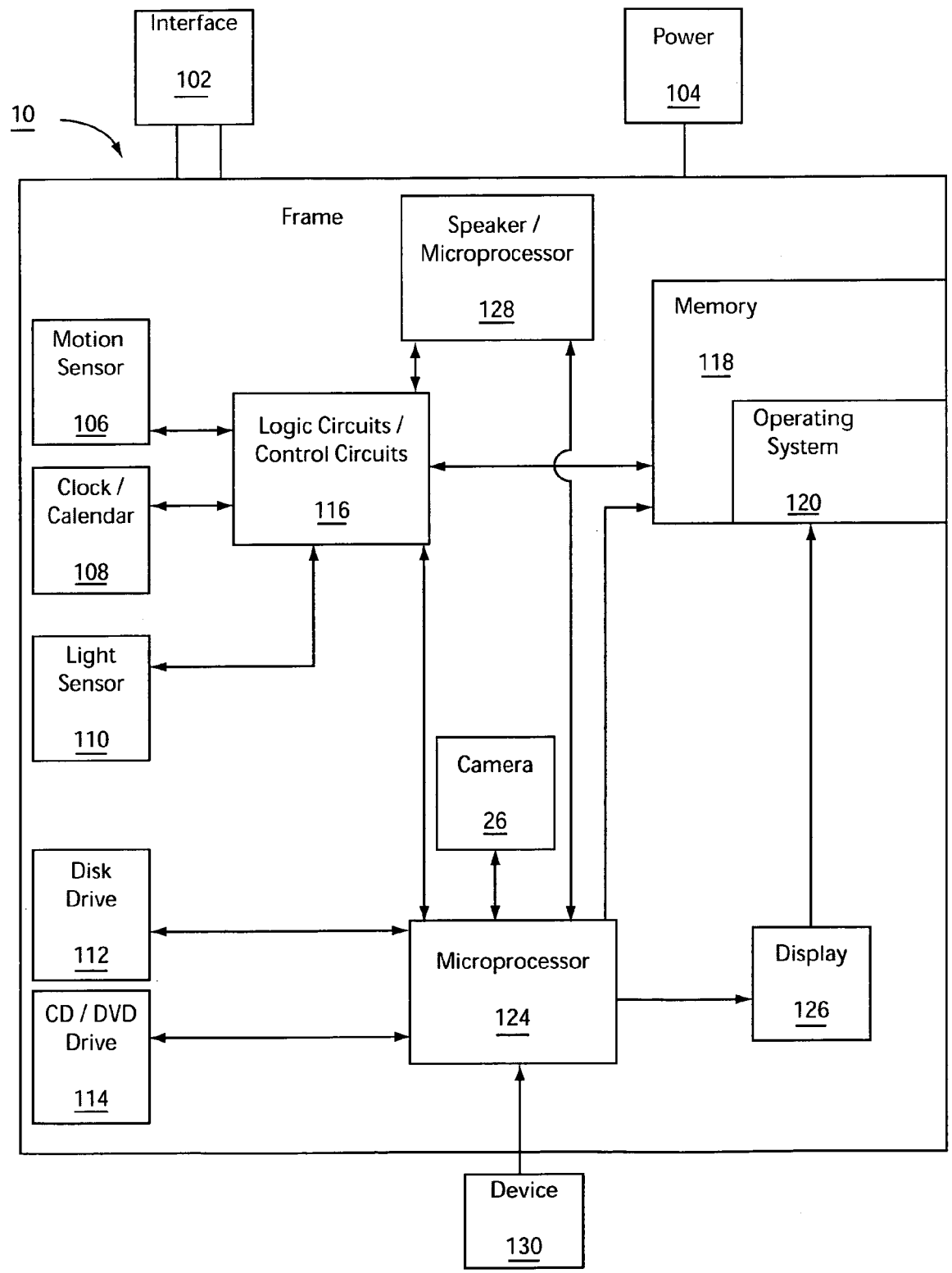
FIG. 5 is a block diagram of the components of a frame in accordance with the present invention.

Referring to FIG. 5, a block diagram is shown for components of frame 10 in accordance with the present invention. The blocks indicated in FIG. 5 may be implemented in software, hardware or a combination of both. Frame 10 includes circuitry with different features. These features are preferably implemented using hardware such as integrated circuit chips (ICs). A motion sensor 106 includes a motion sensing interface for detecting motion in a vicinity of frame 10. Motion sensor includes a switch which is activated for turning on a particular function such as outputting audio through speaker 128. Motion sensor devices 106 are known in the art and can be adapted to be employed in accordance with the present invention. A clock/calendar circuit or chip 108 keeps track of time and date. This information may be employed for different functions of frame 10. A light sensor 110 may include a solar cell or other light sensitive element. Light sensor 110 includes a circuit which provides a signal proportional to the amount of light incident on frame 10. In one embodiment, a logic circuit or chip 116 is employed to activate a particular function when at least one of motion sensing, achieving a particular time or date or achieving a particular lighting condition is experienced. Logic circuit 116 may act independently or in conjunction with microprocessor 124. For example, motion is detected and display 126 is activated showing the last picture in memory, or light intensity has decreased and display intensity is thereby reduced. In another example, a programmed birthday or event has been achieved and display 126 is prompted to display a birthday photograph or a birthday message.

Logic circuitry 116 may be employed as a control circuit to set the clock, or adjust the settings for motion sensor 106 and light sensor 110. Logic circuitry can be controlled by microprocessor 124 through operating system 120 which is preferably stored in memory or directly through interface 102. Interface 102 may include an input device such as a joystick, infrared remote, touch screen or ball and menus displayed on screen (display 126) as controlled by operating system 120. Alphanumeric characters may be displayed on display 126 and a cursor may be moved and "clicked" on the alphanumeric character to write these letters for different functions. For example, photographs or images may be labeled for storage in a memory 118 or details of each photo or image may be recorded and associated with the image.

Memory 118 may include as much memory as permitted by space constraints of frame 10. In one embodiment, at least 10 Mbits of memory is supplied. This provides the capability of storing up to about 70 photographs taken by a digital camera. More or less memory may be provided as needed.

Microprocessor 124 may include a conventional microprocessor, such as those employed in higher end personal digital assistants (PDAs). Advantageously, the present invention is not limited by memory capacity or power as is often a problem with PDAs. The present invention can employ slower chips such as a 25 MHz (or higher) since computations are minimal. This saves on cost. Faster chips may be employed as different functions are provided which need a greater number of computations. Disk drive 112 and CD/DVD drive 114 are controlled through microprocessor 124 in conjunction with operating system 120. These devices are employed as is known in the art. Other memory storage devices may be employed as well and the display may be adapted to receive these devices. Models and designs for disk drives such as those employed for lap top computers may be utilized by the present invention.

Display 126 includes a plurality of pixels arranged in a pixel array. Pixels may be activated by transistors located on display 126, for example thin film transistors. Pixels are preferably active matrix pixels, however other display types may be suitable. Images stored in memory 118 are retrieved and displayed on display of frame 10. Frame 10 maintains the image such that a photographic display frame is achieved by the invention.

Operating system 120 may include a commercially available operating system. In a preferred embodiment, a Windows™ operating system may be employed. Operating system 120 may be "watered down" since all the functions needed for computers may not be needed for the present invention. Operating system 120 may include an operating system employed for PDAs. Operating system 120 includes all protocols and interface information for controlling the functions of components of frame 10. Operating system may further include protocols for interfacing with external devices 130 in a direct manner. Devices 130 may include computers, a VCR, a camcorder, the Internet, and preferably a digital camera. In this way photos may be downloaded to memory 118 through microprocessor 124 and operating system 120. A power source 104 for frame 10 preferably includes an AC plug which may have a DC adapter to provide power to frame 10. Microprocessor 124 and/or operating system 120 may provide for pixel addressing in accordance with memory 118.

Having described preferred embodiments of a digital picture frame (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention.

What is claimed is:

1. A stand alone and mountable picture display for displaying still digital pictures, comprising:
    a mountable picture frame adapted to digitally display at least one still image thereon;
    the picture frame being a stand alone unit including:
        a display screen for displaying the at least one still image stored in a memory;
        the memory for storing the at least one still image;
        an interface coupled to the memory for downloading still images to the memory; and
        control circuitry coupled to the display screen for automatically activating the display screen in accordance with an event, wherein the event includes one of a change in light intensity, and a sound detected in proximity of the display.

2. The display as recited in claim 1, further comprising a microprocessor coupled to the memory for managing display data for still images.

3. The display as recited in claim 1, wherein the control circuitry changes an image displayed in accordance with an event.

4. The display as recited in claim 1, wherein the interface is adapted to receive image data from a digital camera, a VCR, a computer or the Internet.

5. The display as recited in claim 1, wherein the interface is adapted to receive image data from portable memory device.

6. The display as recited in claim 1, wherein the picture frame is one of wall mountable and desk top mountable.

7. The display as recited in claim 1, wherein the picture frame is adapted to receive a plug for a power source.

8. The display as recited in claim 1, further comprising an operating system stored in the memory for permitting a user to interact with the picture frame.

9. The display as recited in claim 8, wherein the operating system stored in the memory permits the user to select from a plurality of images stored therein to display on the screen.

10. The display as recited in claim 1, further comprising a speaker for providing sounds stored in the memory in accordance with an event.

11. The display as recited in claim 10, wherein the event includes one of a predetermined time or date, a change in light intensity, a sound and motion detected in proximity of the display.

12. The display as recited in claim 1, wherein the event includes motion detected in the proximity of the device.

13. A stand alone and mountable picture display for displaying digital images, comprising:
    a wall mountable display adapted to digitally display still images thereon, the display being a stand alone unit including:
    a processor coupled to the display for managing data to be displayed on a screen of the display, the data being stored in a memory;
    a portable memory device drive coupled to the memory through the processor and adapted to receive portable memory devices for downloading images from the portable memory devices;
    the memory coupled to the processor for storing images to be displayed on the screen, the memory being adapted to receive image data from a portable memory device;
    a digital still camera coupled to the processor for displaying images taken in real-time; and
    a control circuitry coupled to the display screen for automatically activating the display screen in accordance with an event, wherein the event includes on of a change in light intensity and a sound detected in proximity of the display.

14. The display as recited in claim 13, wherein the portable memory device drive is adapted to receive image data from one of a compact disk, DVD and a floppy disk.

15. The display as recited in claim 14, further comprising a microphone for interacting with the display.

16. The display as recited in claim 13, wherein the portable memory device drive is adapted to receive image data from one of a digital camera, a VCR, and a computer.

17. The display as recited in claim 13, wherein the display includes a picture frame.

18. The display as recited in claim 13, wherein the display is adapted to receive a plug for a power source.

19. The display as recited in claim 13, further comprising an operating system stored in the memory for permitting a user to interact with the display.

20. The display as recited in claim 19, wherein the operating system stored in the memory permits the user to select from a plurality of images stored in the memory or on the portable memory device to display on the screen.

21. The display as recited in claim 13, wherein the display is adapted to receive images from the Internet.

22. A stand alone and mountable picture display for displaying still digital pictures, comprising:
   a wall mountable or desk top mountable picture frame adapted to digitally display at least one still image thereon;
   the picture frame being a stand alone unit including:
   a display screen for displaying the at least one still image stored in a memory;
   the memory for storing the at least one still image;
   a microprocessor coupled to the memory for managing display data for the at least one still image;
   control circuitry coupled to the microprocessor for one of automatically activating the display screen in accordance with an event and automatically changing an image displayed in accordance with the event;
   a speaker coupled to the control circuitry for providing sounds stored in the memory in accordance with the event;
   wherein the event includes a sound detected in proximity of the display;
   an interface coupled to the memory for downloading still images to the memory; and
   a power adapter for receiving a plug for a power source.

23. The display as recited in claim 22, wherein the interface is adapted to receive image data from a digital camera, a VCR, a computer or the Internet.

24. The display as recited in claim 22, wherein the interface is adapted to receive image data from portable memory device.

25. The display as recited in claim 22, further comprising an operating system stored in the memory for permitting a user to interact with the display.

26. The display as recited in claim 22, wherein the operating system stored in the memory permits the user to select from a plurality of images stored therein to display on the screen.

27. The display as recited in claim 22, further comprising a digital camera coupled to the processor for displaying images taken in real-time.

28. The display as recited in claim 22, wherein the event includes motion detected in the proximity of the device.

29. A stand alone and mountable picture display for displaying still digital pictures, comprising:
   a mountable picture frame adapted to digitally display at least one still image thereon;
   the picture frame being a stand alone unit including:
   a display screen for displaying the at least one still image stored in a memory;
   the memory for storing the at least one still image;
   an interface coupled to the memory for downloading still images to the memory; and
   control circuitry coupled to the display screen for automatically changing an image of the display screen in accordance with an event, wherein the event includes one of a change in light intensity, and a sound detected in proximity of the display.

30. The display as recited in claim 29, wherein the event includes motion detected in the proximity of the device.

31. A stand alone and mountable picture display for displaying digital images, comprising:
   a wall mountable display adapted to digitally display still images thereon, the display being a stand alone unit including:
   a processor coupled to the display for managing data to be displayed on a screen of the display, the data being stored in a memory;
   a portable memory device drive coupled to the memory through the processor and adapted to receive portable memory devices for downloading images from the portable memory devices;
   the memory coupled to the processor for storing images to be displayed on the screen, the memory being adapted to receive image data from a portable memory device;
   a digital still camera coupled to the processor for displaying images taken in real-time;
   a control circuitry coupled to the display screen for automatically activating the display screen in accordance with an event, wherein the event includes on of a change in light intensity and a sound detected in proximity of the display; and
   a speaker for automatically providing sounds stored in the memory in accordance with the event.

* * * * *